US012774701B2

(12) United States Patent
Wang et al.

(10) Patent No.: US 12,774,701 B2
(45) Date of Patent: Oct. 27, 2026

(54) THERMALLY RESPONSIVE ACTUATOR

(71) Applicant: Illinois Tool Works Inc., Glenview, IL (US)

(72) Inventors: Jian Wang, Shanghai (CN); Ding Xue, Shanghai (CN); Yanxing Wu, Shanghai (CN); Jing Cheng, Shanghai (CN); Jingyi Wang, Shanghai (CN); Zhigeng Wei, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 19/228,972

(22) Filed: Jun. 5, 2025

(65) Prior Publication Data

US 2025/0376975 A1 Dec. 11, 2025

(30) Foreign Application Priority Data

Jun. 7, 2024 (CN) ......................... 202410740791.5
May 30, 2025 (CN) ......................... 202510724254.6

(51) Int. Cl.
*F03G 7/06* (2006.01)

(52) U.S. Cl.
CPC .......... *F03G 7/06114* (2021.08); *F03G 7/067* (2021.08)

(58) Field of Classification Search
CPC ... F03G 7/06114; F03G 7/067; F03G 7/06113
USPC .................................................... 60/527–529
See application file for complete search history.

(56) References Cited

U.S. PATENT DOCUMENTS 3,166,892 A * 1/1965 Sherwood .............. F16J 15/162 60/527
4,280,478 A * 7/1981 Duval ..................... F24S 50/40 60/527
2012/0091212 A1* 4/2012 Guilhamat ........... G05D 23/022 60/527
2016/0069330 A1* 3/2016 Mcdonald ........... F03G 7/06113 60/527
2016/0123310 A1* 5/2016 Hawkins ............. F03G 7/06113 60/527
2018/0171989 A1* 6/2018 Lamb ..................... G05D 23/02

* cited by examiner

*Primary Examiner* — Hoang M Nguyen
(74) *Attorney, Agent, or Firm* — McAndrews, Held & Malloy, Ltd.

(57) ABSTRACT

The thermally responsive actuator described in this disclosure includes a housing, a thermal expansion material, a piston, and a closure assembly. The housing has an internal cavity and an opening that leads into the cavity. The thermal expansion material is placed inside the cavity. The piston extends at least partially through the opening into the cavity. The closure assembly, which includes a cover and a sealing system, is attached to the housing at the opening. It covers the opening and surrounds the piston. The sealing system includes two sealing members: a first and a second. The housing and/or the cover has two separate compartments—one for each sealing member—positioned along the same axis but separated by the cover.

20 Claims, 10 Drawing Sheets

THERMALLY RESPONSIVE ACTUATOR

RELATED APPLICATIONS

The present application claims the benefit of Chinese Patent Application Nos. 2024107407915, filed Jun. 7, 2024, and 2025107242546, filed May 30, 2025, each titled "Thermally Responsive Actuator," the contents of which are hereby incorporated by reference.

TECHNICAL FIELD

The present disclosure relates generally to a thermally responsive actuator that provides mechanical actuation in response to heating.

BACKGROUND

The thermally responsive actuator that provides mechanical actuation in response to heating, also known as a wax motor, provides simple and reliable linear actuation in some applications. The thermally responsive actuator typically includes a housing that accommodates an expansion material, such as wax, and a piston. When the housing is heated, the wax expands by heat, thereby driving the piston to move outward. A return spring is provided in the associated mechanical assembly outside the thermally responsive actuator, and when the wax cools, the piston returns to the housing under the action of the return spring. For example, the thermally responsive actuator may be employed in a thermostatic valve used in a cooling circuit of a vehicle and form thermal contact with a cooling medium circulating in the cooling circuit, and when the expansion material in the thermally responsive actuator expands under thermal induction of the cooling medium, the thermally responsive actuator allows a valve element in the thermostatic valve to move in the housing of the thermostatic valve, thereby switching a flow path of the cooling medium.

SUMMARY OF THE DISCLOSURE

The present disclosure relates generally to a thermally responsive actuator, substantially as illustrated by and described in connection with at least one of the figures, as set forth more completely in the claims.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1:
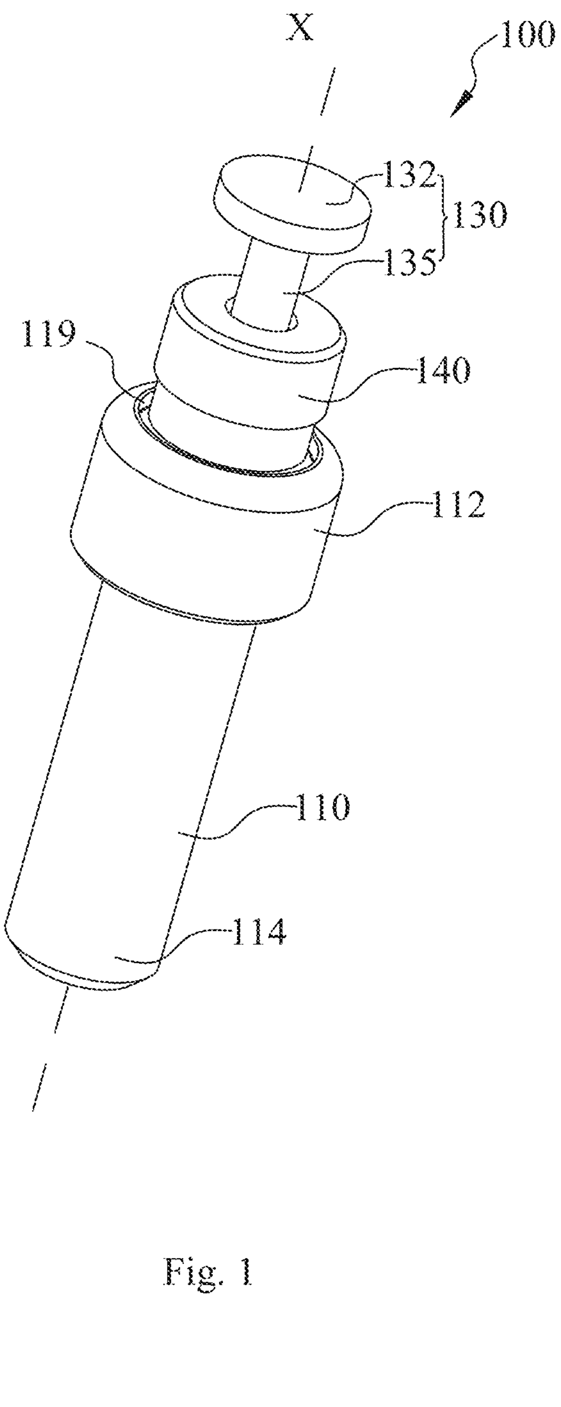
FIG. 1 is a perspective view of a thermally responsive actuator according to an aspect of the present disclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein is not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent to or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y, and/or z" means "one or more of x, y, and z."

It has been found that existing thermally responsive actuators sometimes have the problem of poor sealing.

To at least partially solve the above problem, according to a first aspect of the present disclosure, the present disclosure provides a thermally responsive actuator including a housing, a thermal expansion material, a piston and a closure assembly. The housing includes a housing cavity and an opening in connection with the housing cavity. The thermal expansion material is accommodated in the housing cavity. The piston extends at least partially through the opening into the housing cavity. The closure assembly includes a cover device and a sealing device, is attached to the housing at the opening, and covers the opening and surrounds the piston. The sealing device includes a first sealing member and a second sealing member. One or both of the housing and the cover device define(s) a first accommodating portion and a second accommodating portion, where the first accommodating portion and the second accommodating portion are separated from each other in an axial direction of the thermally responsive actuator by the cover device, so as to independently accommodate at least a portion of the first sealing member and at least a portion of the second sealing member, respectively.

In some examples, the first accommodating portion and the second accommodating portion respectively have a predetermined first axial distance and a predetermined second axial distance.

In some examples, the second sealing member is further away from the expansion material than the first sealing member, a minimum operating temperature of the second sealing member is less than a minimum operating temperature of the first sealing member, and an oil resistance of the first sealing member is superior to an oil resistance of the second sealing member.

In some examples, the first sealing member is made of any one of the materials from the following group: hydrogenated nitrile rubber and nitrile rubber; and the second sealing member is made of any one of the materials from the following group: ethylene propylene diene monomer and silicone rubber.

In some examples, the cover device includes an outer cover including a separating portion, and the first accommodating portion and the second accommodating portion are separated by the separating portion of the outer cover.

In some examples, the cover device further includes an inner cover disposed in the outer cover, the first axial distance of the first accommodating portion is defined by the inner cover and the separating portion of the outer cover, and the second axial distance of the second accommodating portion is defined by the housing and the separating portion of the outer cover.

In some examples, the cover device includes an outer cover and an inner cover, the inner cover being disposed in the outer cover, and the first accommodating portion and the second accommodating portion being separated by the inner cover.

In some examples, the inner cover and the outer cover are provided with a limiting structure to limit movement of the inner cover relative to the outer cover in a direction away from the expansion material.

In some examples, the outer cover includes a bottom away from the housing, the first axial distance of the first accommodating portion is defined by the inner cover and the housing, and the second axial distance of the second accommodating portion is defined by the inner cover and the bottom of the outer cover.

According to a second aspect of the present disclosure, the present disclosure provides a thermally responsive actuator including a housing, a thermal expansion material, an outer cover, a piston, a first sealing member and a second sealing member. The housing defines a housing cavity and an opening in connection with the housing cavity. The thermal expansion material is accommodated in the housing cavity. The outer cover is attached to the housing at the opening and has a separating portion defining an outer cover connecting passage. The piston extends at least partially through the outer cover connecting passage into the housing cavity. The first sealing member and the second sealing member sealingly connect the piston with the outer cover. The first sealing member and the second sealing member are separated by the separating portion of the outer cover.

In some examples, the outer cover defines a first outer cover cavity and a second outer cover cavity on opposite sides of the separating portion, where the second outer cover cavity is further away from the expansion material than the first outer cover cavity. The thermally responsive actuator also includes an inner cover disposed in the second outer cover cavity. The first sealing member is at least partially accommodated in the first outer cover cavity, and the second sealing member is accommodated between the inner cover and the separating portion of the outer cover.

In some examples, the second sealing member is further away from the expansion material than the first sealing member, and a minimum operating temperature of the second sealing member is less than a minimum operating temperature of the first sealing member.

According to a third aspect of the present disclosure, the present disclosure provides a thermally responsive actuator including a housing, a thermal expansion material, an outer cover, an inner cover, a piston, a first sealing member and a second sealing member. The housing defines a housing cavity and an opening in connection with the housing cavity. The thermal expansion material is accommodated in the housing cavity. The outer cover is attached to the housing at the opening and has a bottom defining an outer cover connecting passage. The inner cover is disposed in the outer cover and has an inner cover connecting passage. The piston extends at least partially through the outer cover connecting passage and the inner cover connecting passage into the housing cavity. The first sealing member and the second sealing member sealingly connect the piston with the outer cover. The first sealing member and the second sealing member are separated by the inner cover.

In some examples, the outer cover defines an outer cover cavity located on a side of the bottom close to the expansion material; and the second sealing member, the inner cover, and at least part of the first sealing member are accommodated in the outer cover cavity.

In some examples, the second sealing member is further away from the expansion material than the first sealing member, and a minimum operating temperature of the second sealing member is less than a minimum operating temperature of the first sealing member.

The thermally responsive actuator of the present disclosure may achieve an excellent sealing effect by providing a closure assembly with two sealing members and by providing accommodating portions separated by a rigid cover device for the two sealing members.

FIGS. 1-3C show a specific structure of a thermally responsive actuator 100 according to a first aspect of the present disclosure.

Figure 3A:
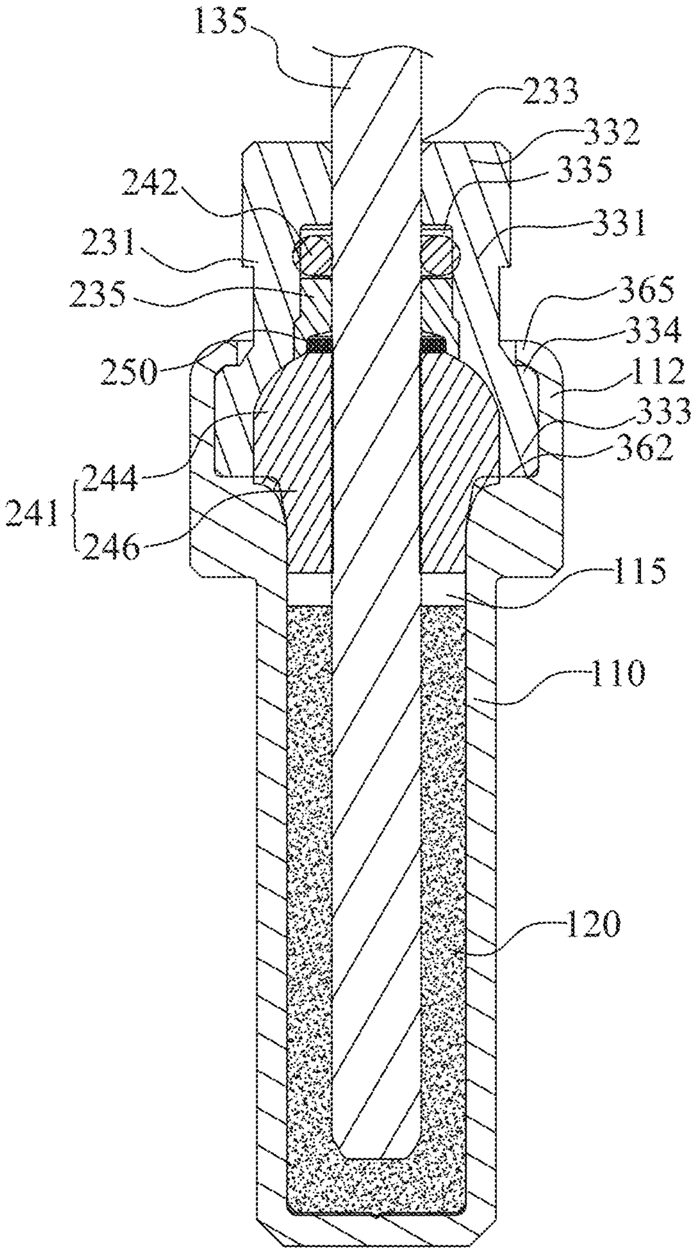
FIG. 3A is an axial cross-sectional view of the thermally responsive actuator shown in FIG. 1 in an assembled state.

FIG. 1 is a perspective view of the thermally responsive actuator 100. As shown in FIG. 1, the thermally responsive actuator 100 includes a housing 110, a piston 130 and a closure assembly 140, and has an axis X. The housing 110 accommodates an expansion material 120 (as shown in FIG. 3A), and the piston 130 extends at least partially into the housing 110 and is axially movable relative to the housing 110. The closure assembly 140 is configured to enclose the expansion material 120 in the housing 110 to prevent leakage of the expansion material from the housing 110 and entry of outside substances, such as liquid, into the housing 110, while allowing the piston 130 to move through the closure assembly 140. When the expansion material 120 expands by heat, the expansion material 120 pushes the piston 130 to move outward. In contrast, when the expansion material 120 cools and contracts, the piston 130 moves back into the housing 110 under the action of an external device, such as a return spring, which is not shown. The housing 110 and the piston 130 are, for example, rigid components made of metal.

Figure 2:
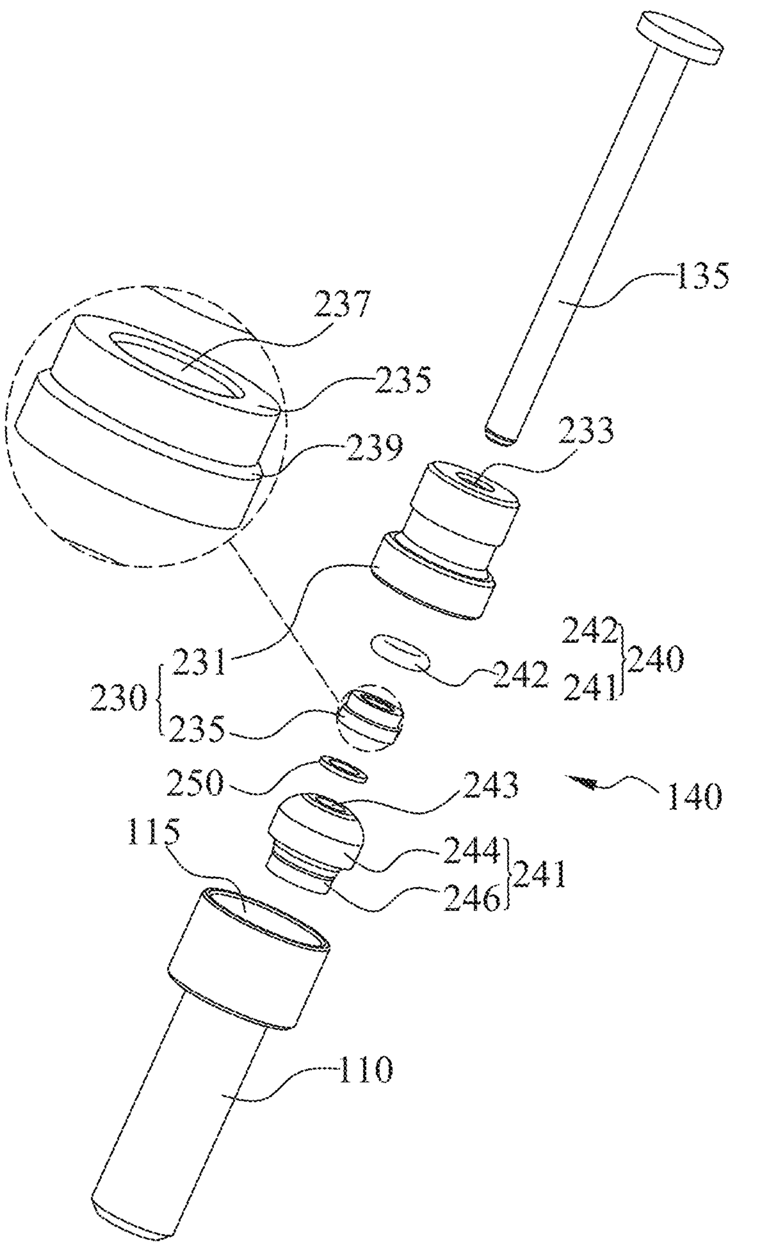
FIG. 2 is an exploded view of the thermally responsive actuator shown in FIG. 1.

The housing 110 includes an axially extending housing cavity 115 (as shown in FIG. 2), and includes a first axial end 112 and a second axial end 114 that are opposite each other. The housing 110 further includes an opening 119 provided at the first axial end 112, and the opening 119 is in connection with the housing cavity 115. The second axial end 114 of the housing 110 is closed, so that the housing 110 is generally cup-shaped. The expansion material 120 is accommodated in the housing cavity 115.

The piston 130 includes a piston head 132 and a piston rod 135. The piston rod 135 is inserted into the housing cavity 115 from the opening 119 of the housing 110, and the piston head 132 is always outside the housing 110.

The closure assembly 140 is attached to the first axial end 112 of the housing 110, covers the opening 119 of the housing 110, and surrounds the piston rod 135.

FIG. 2 is an exploded view of the thermally responsive actuator 100. As shown in FIG. 2, the closure assembly 140 includes a cover device 230, a sealing device 240 and a washer 250. The cover device 230 is made of a substantially rigid material, such as metal. The sealing device 240 is made of an elastic material, such as rubber. The washer 250 is made of a plastic material such as polytetrafluoroethylene (PTFE).

As still shown in FIG. 2, the cover device 230 includes an outer cover 231 and an inner cover 235. Both the outer cover 231 and the inner cover 235 are generally cylindrical. The outer cover 231 has an outer cover connecting passage 233, and the inner cover 235 has an inner cover connecting passage 237, both for receiving the piston rod 135. A step portion 239 is provided on an outer surface of the inner cover 235 to cooperate with an inner surface of the outer cover 231 to limit an axial position of the inner cover 235 relative to the outer cover 231. The closure assembly 140 is attached to the housing 110 through the outer cover 231.

The sealing device 240 includes a first sealing member 241 and a second sealing member 242. The second sealing member 242 is further away from the expansion material 120 than the first sealing member 241. The first sealing member 241 is generally mushroom-shaped and is provided with a connecting passage 243. The first sealing member includes a head 244 with a larger diameter and a shank 246 with a smaller diameter. The head 244 of the first sealing member 241 is generally hemispherical, and the shank 246 is generally cylindrical. The second sealing member 242 is generally in the form of a seal ring. In some examples, a minimum operating temperature of the second sealing member 242 is less than a minimum operating temperature of the first sealing member 241. For example, the minimum operating temperature of the second sealing member 242 is less than −40° C., while the minimum operating temperature of the first sealing member is greater than −40° C. In some examples, the first sealing member 241 has a better oil resistance than the second sealing member 242. For example, the first sealing member 241 is made of hydrogenated nitrile rubber (HNBR) or nitrile rubber (NBR). The second sealing member 242 is made of ethylene propylene diene monomer (EPDM) or silicone rubber (VMQ). It will be appreciated by those skilled in the art that the materials of the first sealing member 241 and the second sealing member 242 are not limited to the materials listed above.

Figure 3B:
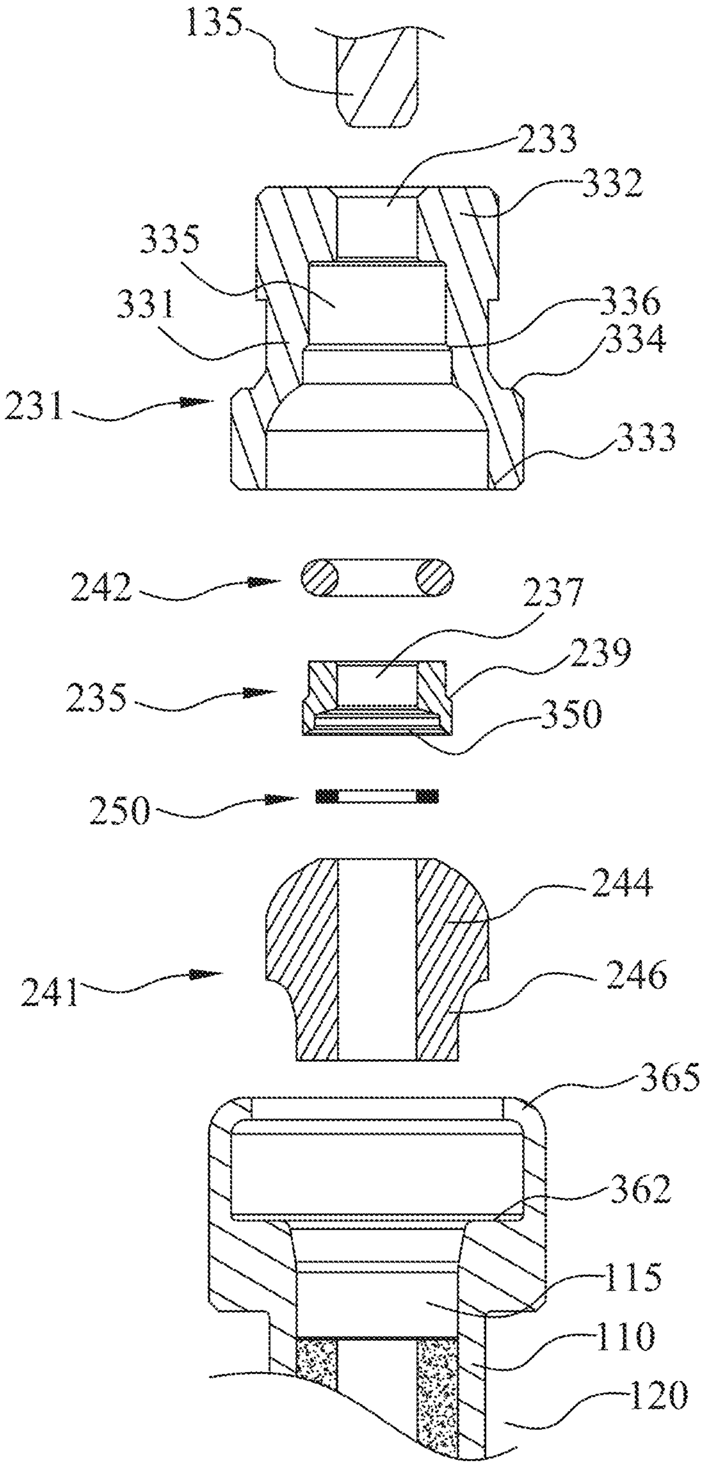
FIG. 3B is an axial cross-sectional view of a portion of the thermally responsive actuator shown in FIG. 1 in an exploded state.
Figure 3C:
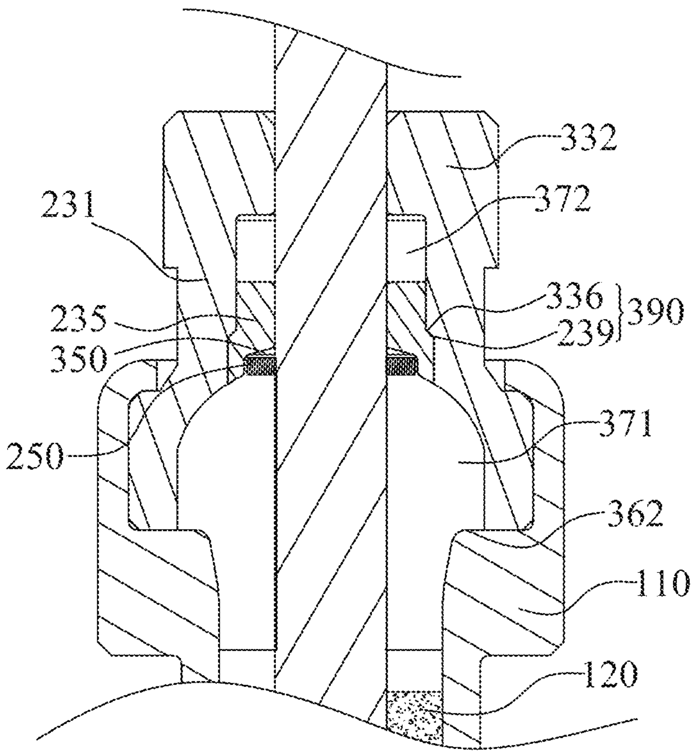
FIG. 3C is an axial cross-sectional view of a portion of the thermally responsive actuator shown in FIG. 1 in an assembled state.

FIG. 3A is an axial cross-sectional view of the thermally responsive actuator 100 in an assembled state, showing only a portion of the piston rod 135. FIG. 3B is an axial cross-sectional view of a portion of the thermally responsive actuator 100 in an exploded state, showing only a portion of the piston rod 135 and a portion of the housing 110. FIG. 3C is an axial cross-sectional view of a portion of the thermally responsive actuator 100 in an assembled state, with the first sealing member and the second sealing member not shown.

As shown in FIGS. 3A and 3B, the outer cover 231 includes a body 331, and a bottom 332 and an open end 333 located at two opposite axial ends of the body 331. The body 331 is generally cylindrical and defines an outer cover cavity 335. The outer cover 231 has an outer cover connecting passage 233 extending through the bottom 332 and in connection with the outer cover cavity 335. Thus, the outer cover 231 is generally cup-shaped, and the outer cover cavity 335 is located on a side of the bottom 332 close to the expansion material 120. The outer cover 231 is provided with a radially projecting connecting portion 334 on an outer peripheral surface at the open end 333 thereof.

As shown in FIG. 3A, the open end 333 of the outer cover 231 is accommodated in the first axial end 112 of the housing 110, and is connected to the first axial end 112 of the housing 110, for example, by riveting. As shown in FIGS. 3A and 3B, the housing 110 is provided with a step portion 362 facing the outer cover 231 at the first axial end 112 thereof. The open end 333 of the outer cover 231 abuts against the step portion 362 of the housing 110 to limit downward movement of the outer cover 231 relative to the housing 110. By pressing and bending an edge of the second axial end 112 of the housing 110, the edge is bent inwardly to form a flange 365. The flange 365 axially covers the connecting portion 334 of the outer cover 231, limiting the upward movement of the outer cover 231 relative to the housing 110. Thus, the outer cover 231 is fixedly connected to the housing 110 and thereby attaches the closure assembly 140 to the housing 110. In other aspects, the manner in which the outer cover 231 is connected to the housing 110 is not limited to the aspect shown in the figures, but other means of connection, such as welding or interference fit connection, may be taken. In addition, the head 244 of the first sealing member 241 also abuts against the step portion 362 of the housing 110 to limit the downward movement of the first sealing member 241 relative to the housing 110. The shank 246 of the first sealing member 241 does not abut against the step portion 362 of the housing 110, but extends downwardly toward the expansion material 120.

As shown in FIG. 3A, the outer cover cavity 335 is in connection with the housing cavity 115 of the housing 110 to accommodate the remaining components of the closure assembly 140, including the first sealing member 241, the second sealing member 242, the inner cover 235 and the washer 250. The piston rod 135 passes through the outer cover connecting passage 233 of the outer cover 231, the second sealing member 242, the inner cover 235, the washer 250 and the first sealing member 241 in sequence into the expansion material 120 accommodated in the housing cavity 115, thereby enabling the piston rod 135 to move axially outward under the action of the expansion material 120. The bottom 332 of the outer cover 231 has a certain length in the axial direction, so that the outer cover connecting passage 233 thereon extends by a certain distance in the axial direction. The diameter of the outer cover connecting passage 233 is comparable to the diameter of the piston rod 135 and is only slightly larger than the diameter of the piston rod 135. Thus, the bottom 332 of the outer cover 231 forms a guide section for guiding the axial movement of the piston rod 135.

The head 244 of the first sealing member 241 abuts the piston rod 135 on its radially inner side and abuts the outer cover 231 on its radially outer side. The second sealing member 242 abuts the piston rod 135 on its radially inner side and abuts the outer cover 231 on its radially outer side. The first sealing member 241 and the second sealing member 242 are thus able to seal a gap between the piston rod 135 and the outer cover connecting passage 233 of the outer cover 231, thereby sealingly connecting the piston rod 135 with the outer cover 231, thus preventing leakage of the thermal expansion material 120 from the housing 110, and preventing external substances from entering the housing 110.

As shown in FIGS. 2, 3A and 3B, the step portion 239 on the outer surface of the inner cover 235 is formed by protruding outwardly from the outer surface of the inner cover 235. In the aspect shown in the figures, the step portion 239 extends continuously in a circumferential direction of the inner cover 235. In the aspect shown in the figures, the diameter of the step portion 239 is tapered in a direction away from the expansion material 120 such that the surface of the step portion 239 is of a frusto-conical shape. In other aspects, the step portion 239 may not extend continuously in the circumferential direction or may not be tapered in diameter. As shown in FIG. 3B, the inner cover 235 is provided with an inner cover cavity 350 on a side thereof facing the expansion material 120 to accommodate the washer 250 therein. The washer 250 is configured to prevent the first sealing member 241 from being extruded into the inner cover connecting passage 237 of the inner cover 235.

As shown in FIGS. 3B and 3C, the outer cover 231 is provided with a blocking portion 336 on an inner wall of the body 331 thereof. The blocking portion 336 and the step portion 239 of the inner cover 235 jointly form a limiting structure 390 (FIG. 3C) to limit the movement of the inner cover 235 relative to the outer cover 231 in a direction away from the expansion material 120. In the aspect shown in the figures, the blocking portion 336 has a shape matching the step portion 239 and thus has a flared surface. The blocking portion 336 is formed by enlarging the inner wall of the body 331 of the outer cover 231. In other aspects, the blocking portion 336 may also be of other shapes as long as it can cooperate with the step portion 239 to block the movement of the inner cover 235 relative to the outer cover 231 in a direction away from the expansion material 120.

As shown in FIG. 3C, the inner cover 235 and the step portion 362 of the housing 110 define a first accommodating portion 371 for accommodating the head 244 of the first sealing member 241 (see FIG. 3A). Since the inner cover 235 is limited from upward movement by the outer cover 231, the first accommodating portion 371 may be designed with a predetermined first axial distance that is greater than a thickness of the head 244 of the first sealing member 241 in a relaxed state. The first accommodating portion 371 is thus able to provide a sufficient deformation space for the head 244 of the first sealing member 241 such that it may be radially compressed. The shank 246 of the first sealing member 241 (see FIG. 3A) is located in the cavity 115 of the housing 110. The cavity 115 of the housing 110 can provide a sufficient deformation space for the shank 246 of the first sealing member 241 such that it may be radially compressed.

A second accommodating portion 372 is defined between the inner cover 235 and the bottom 332 of the outer cover 231 to accommodate the second sealing member 242 (see FIG. 3A). Since the inner cover 235 is limited from upward movement by the outer cover 231, the second accommodating portion 372 may be designed with a predetermined second axial distance that is greater than a thickness of the second sealing member 242 in a relaxed state. Thus, the second accommodating portion 372 may provide at least the second axial distance greater than the thickness of the second sealing member 242 in the relaxed state, and may provide a sufficient deformation space for the second sealing member 242 such that it may be radially compressed.

The first accommodating portion 371 and the second accommodating portion 372 of the thermally responsive actuator 100 of the present disclosure are thus axially separated from each other by the inner cover 235, which can accommodate the second sealing member 242 and the head 244 of the first sealing member 241 independently of each other. Since the first accommodating portion 371 and the second accommodating portion 372 are axially separated from each other, the first accommodating portion 371 and the second accommodating portion 372 each can provide a sufficient deformation space for the sealing member or part of the sealing member they accommodate without affecting each other.

Figure 4:
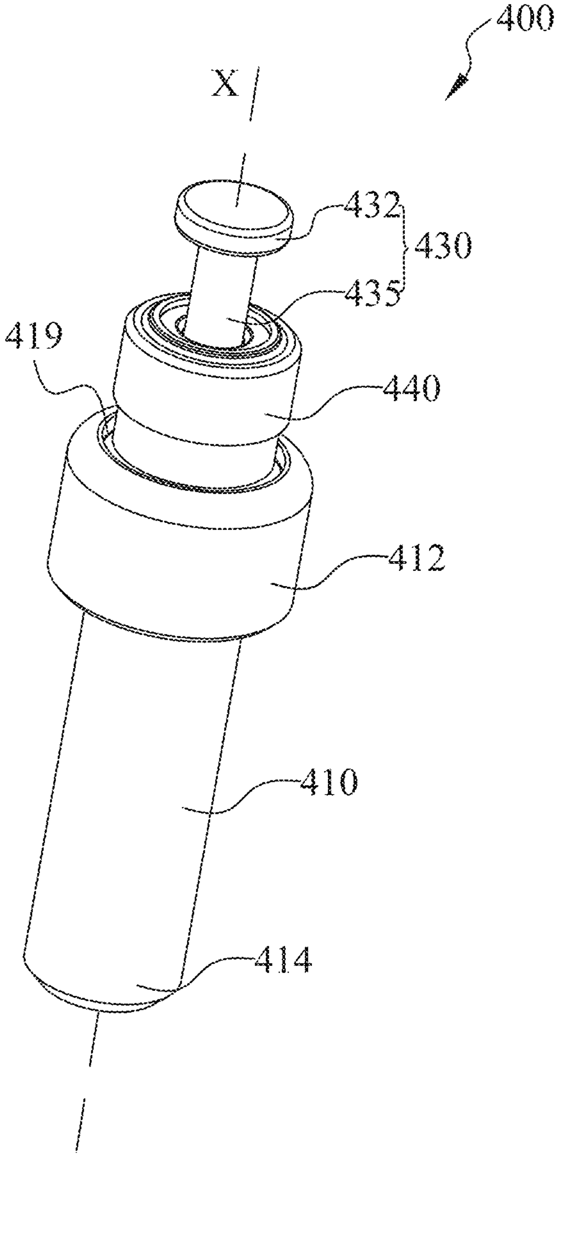
FIG. 4 is a perspective view of a thermally responsive actuator according to a further aspect of the present disclosure.
Figure 5:
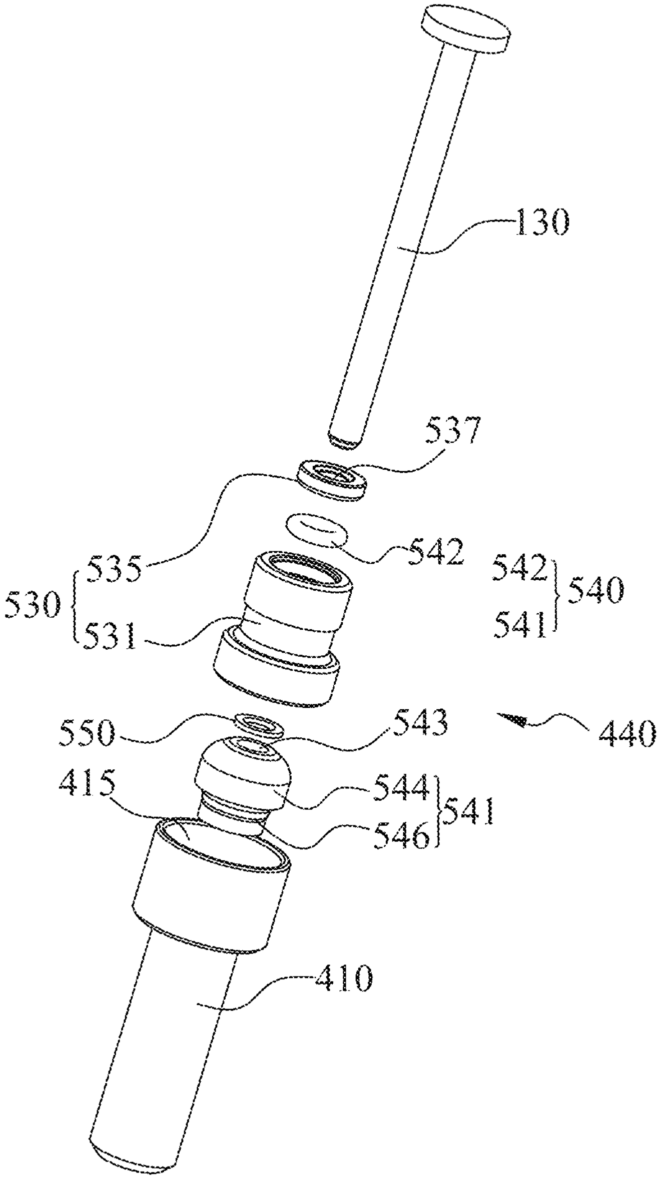
FIG. 5 is an exploded view of the thermally responsive actuator shown in FIG. 4.
Figure 6A:
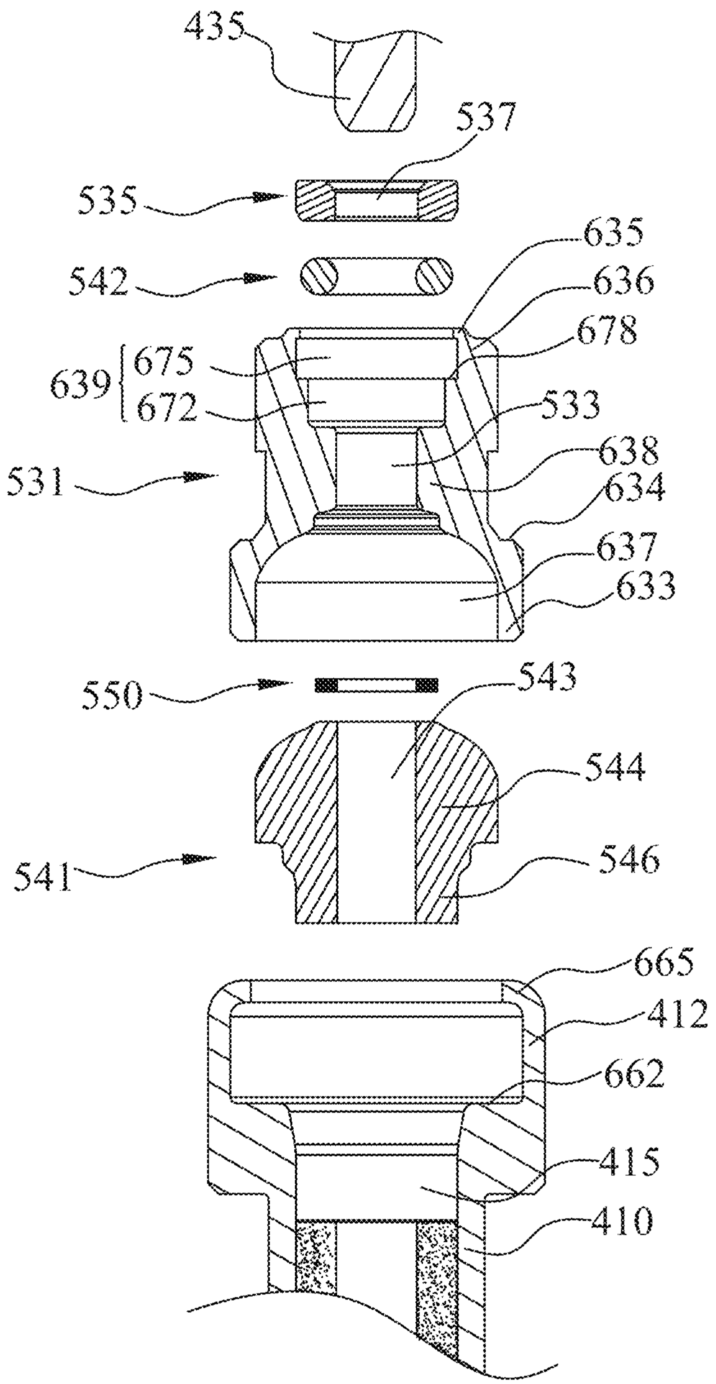
FIG. 6A is an axial cross-sectional view of a portion of the thermally responsive actuator shown in FIG. 4 in an exploded state.
Figure 6B:
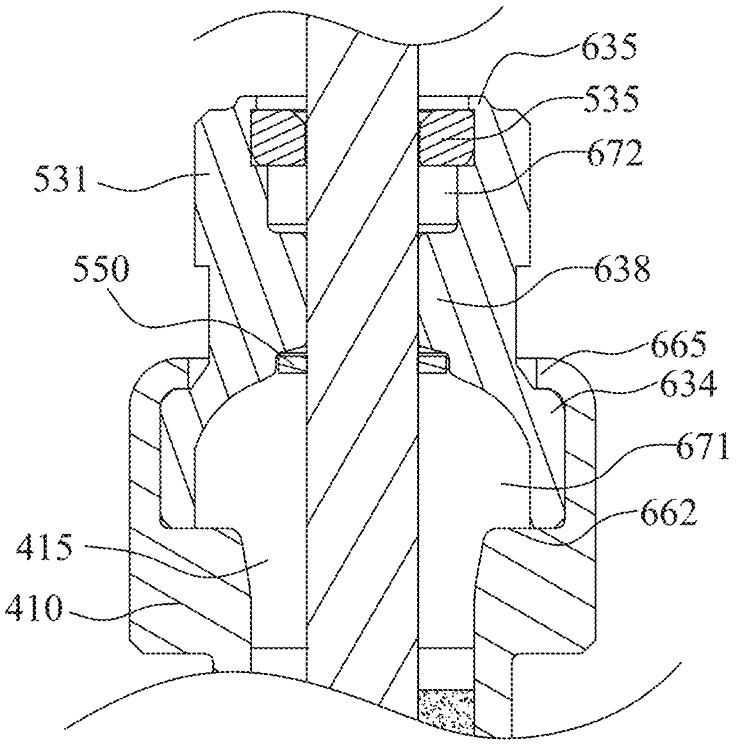
FIG. 6B is an axial cross-sectional view of a portion of the thermally responsive actuator shown in FIG. 4 in an assembled state.
Figure 6C:
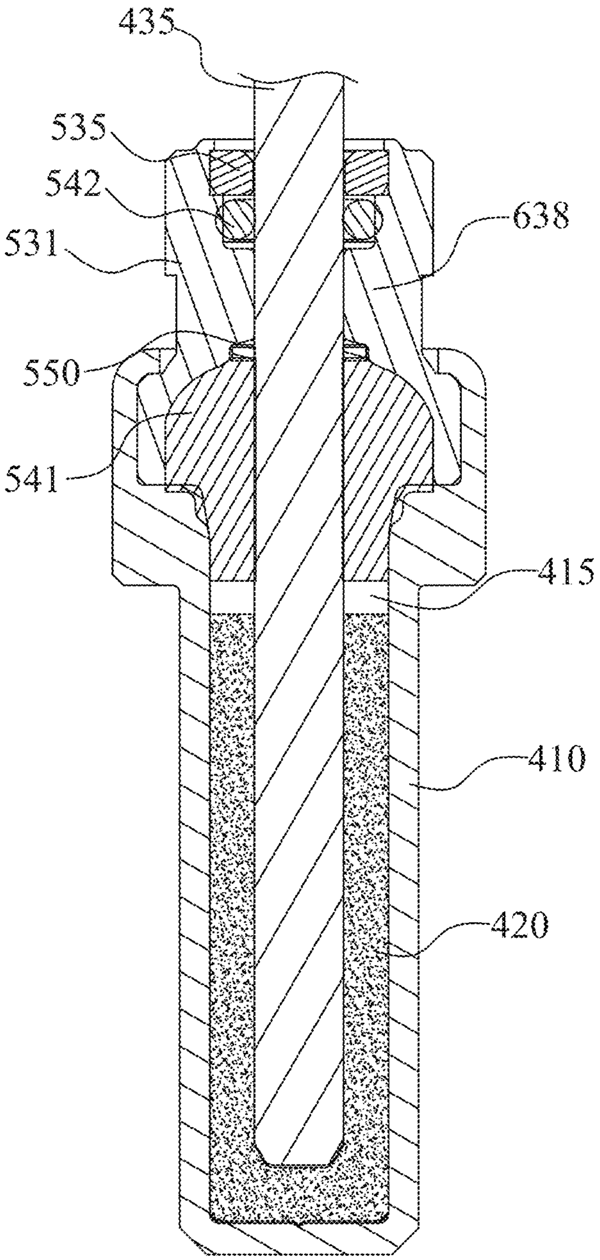
FIG. 6C is an axial cross-sectional view of the thermally responsive actuator shown in FIG. 4 in an assembled state.

FIGS. 4-6C show a specific structure of a thermally responsive actuator 400 according to a second aspect of the present disclosure, where FIG. 4 is a perspective view of the thermally responsive actuator 400, FIG. 5 is an exploded view of the thermally responsive actuator 400, FIG. 6A is an axial cross-sectional view of a portion of the thermally responsive actuator 400 in an exploded state, FIG. 6B is an axial cross-sectional view of a portion of the thermally responsive actuator 400 in an assembled state, and FIG. 6C is an axial cross-sectional view of the thermally responsive actuator 400. The structure of the thermally responsive actuator 400 in the second aspect is similar to that of the thermally responsive actuator 100 in the first aspect, except for the position setting of the second sealing member, and the structure of the outer cover and the structure and the position of the inner cover which are correspondingly configured to achieve the position setting of the second sealing member.

As shown in FIG. 4, the thermally responsive actuator 400 also includes a housing 410, a piston 430 having a piston head 432 and a piston rod 435, and a closure assembly 440. As shown in FIG. 5, the closure assembly 440 also has a cover device 530, a sealing device 540 and a washer 550. The cover device 530 includes an outer cover 531 and an inner cover 535, and the sealing device 540 includes a first sealing member 541 and a second sealing member 542.

The housing 410 is similar to the housing 110 in the aspect shown in FIGS. 1-3C. As shown in FIG. 4, the housing 410 has a first axial end 412 and a second axial end 414 and is provided with an opening 419 at the first axial end 412 thereof. As shown in FIGS. 5 and 6A, the housing 410 defines a cavity 415. As shown in FIG. 6A, the housing 410 is provided with a step portion 662 on an inner wall at the first axial end 412 thereof, and an edge of the first axial end 412 is bent inwardly to form a flange 665.

The first sealing member 541 is similar to the first sealing member 241 in the aspect shown in FIGS. 1-3C. As shown in FIGS. 5 and 6A, the first sealing member 541 has a head 544 and a shank 546 and has a connecting passage 543.

The second sealing member 542 is similar to the second sealing member 242 in the aspect shown in FIGS. 1-3C. As shown in FIGS. 5 and 6A, the second sealing member 542 is also in the form of a seal ring.

The washer 550 is similar to the washer 250 in the aspect shown in FIGS. 1-3C. As shown in FIGS. 5 and 6A, the washer 550 is generally annular.

As shown in FIGS. 5 and 6A, the inner cover 535 is generally annular and defines an inner cover connecting passage 537.

As shown in FIG. 6A, the outer cover 531 has a separating portion 638 defining an outer cover connecting passage 533, and defines a first outer cover cavity 637 and a second outer cover cavity 639. In the axial direction, the first outer cover cavity 637 and the second outer cover cavity 639 are located on opposite sides of the separating portion 638. The first outer cover cavity 637 is configured to accommodate the head 544 of the first sealing member 541 and the washer 550. The second outer cover cavity 639 is configured to accommodate the second sealing member 542 and the inner cover 535. To this end, the second outer cover cavity 639 includes two sections in the axial direction, namely a second accommodating portion 672 close to the outer cover connecting passage 533 and an inner cover accommodating portion 675 away from the outer cover connecting passage 533. The second accommodating portion 672 is configured to accommodate the second sealing member 542, and the inner cover accommodating portion 675 is configured to accommodate the inner cover 535. The radial dimension of the inner cover accommodating portion 675 is larger than the radial dimension of the second accommodating portion 672, so that a step portion 678 is formed therebetween.

The outer cover 531 is further provided with a first open end 633 and a second open end 636 that are opposite each other. The first open end 633 is at the first outer cover cavity 637 and the second open end 636 is at the second outer cover cavity 639. The outer cover 531 is provided with a radially projecting connecting portion 634 on an outer peripheral surface at the first open end 633 thereof. The connecting portion 634 cooperates with the flange 665 of the housing 410 to connect the outer cover 531 to the housing 410 (FIG. 6B). An edge of the second open end 636 of the outer cover 531 is bent inwardly to form a flange 635. The flange 635 is configured to cooperate with the step portion 678 to retain the inner cover 535 in the inner cover accommodating portion 675. The separating portion 638 of the outer cover 531 has a certain length in the axial direction, so that the outer cover connecting passage 533 therein extends by a certain distance in the axial direction. The diameter of the outer cover connecting passage 533 is comparable to the diameter of the piston rod 435 and is only slightly larger than the diameter of the piston rod 435. Thus, the separating portion 638 of the outer cover 531 forms a guide section for guiding the piston rod 435 in the axial direction.

As shown in FIG. 6B, a first accommodating portion 671 is defined between the separating portion 638 of the outer cover 531 and the step portion 662 of the housing 410 to accommodate the head 544 of the first sealing member 541 (see FIG. 6A), and the first accommodating portion 671 is in the first outer cover cavity 637 of the outer cover 531 (see FIG. 6A). The second accommodating portion 672 is provided between the inner cover 535 and the separating portion 638 of the outer cover 531 to accommodate the second sealing member 542 (see FIG. 6A). The first accommodating portion 671 and the second accommodating portion 672 are thus separated by the separating portion 638 of the outer cover 531, so as to independently accommodate the head 544 of the first sealing member 541 and the second sealing member 542.

As shown in FIG. 6C, the piston rod 435 passes through the inner cover 535, the second sealing member 542, the separating portion 638 of the outer cover 531, the washer 550 and the first sealing member 541 in sequence into the expansion material 420 accommodated in the housing cavity 415, thereby enabling the piston rod 435 to move axially outward under the action of the expansion material 420. The first sealing member 541 and the second sealing member 542 can seal a gap between the piston rod 435 and the outer cover connecting passage 533 on the separating portion 638 of the outer cover 531, thereby sealingly connecting the piston rod 435 with the outer cover 531, thus preventing leakage of the thermal expansion material 420 from the housing 410, and preventing external substances from entering the housing 410.

It has been found, after long-term observation and research, that existing thermally responsive actuators suffer from a poor sealing performance, especially when used in an environment where heat is generated by fluid conduction, a fluid easily enters the housing of the thermally responsive actuator, and the thermal expansion material also easily leaks out of the housing of the thermally responsive actuator. It has also been found that the sealing performance of the thermally responsive actuator is more problematic when the ambient temperature is low.

The thermally responsive actuator of the present disclosure may achieve an excellent sealing effect by providing a closure assembly with two sealing members and by providing accommodating portions separated by a rigid cover device for the two sealing members. This is because, when the accommodating portions of the two sealing members are separated by a rigid component, the accommodating portions of the two sealing members may provide sufficient axial deformation spaces for the sealing members or portions of the sealing members each accommodated therein, such that the sealing members or portions of the sealing members are capable of achieving a sufficient radial compression when the thermally responsive actuator is assembled, so as to exert a certain compressive force on the piston rod passing through the sealing members, thereby realizing a better seal. In contrast, if one sealing member enters an accommodating space of the other sealing member when the one sealing member is radially compressed, it may encroach on an axial deformation space of the other sealing member, such that the other sealing member cannot be sufficiently radially compressed, which affects its sealing effect. In addition, during the movement of the piston rod, one sealing member does not enter the accommodating portion of the other sealing member, thus not affecting the radial compression of the other sealing member.

In addition, among the first sealing member and the second sealing member of the thermally responsive actuator of the present disclosure, the second sealing member further away from the expansion material is selected from a material having a lower minimum operating temperature than the minimum operating temperature of the first sealing member, which allows the thermally responsive actuator of the present disclosure to have an excellent sealing effect even under lower temperature conditions (e.g., −40° C.), and can effectively prevent the thermal expansion material from leaking from the opening of the housing and prevent external substances from entering the housing.

In addition, the thermally responsive actuator of the present disclosure is simple in overall construction and is easy to manufacture and assemble.

Although the present disclosure is described with respect to the examples of aspects outlined above, various alternatives, modifications, variations, improvements, and/or substantial equivalents that are known or current or to be anticipated before long may be obvious to those of at least ordinary skill in the art. In addition, the technical effects and/or technical problems described in this specification are exemplary rather than limiting; Therefore, the disclosure in this specification may be used to solve other technical problems and have other technical effects and/or may solve other technical problems. Accordingly, the examples of the aspects of the present disclosure as set forth above are intended to be illustrative rather than limiting. Various changes can be made without departing from the spirit or scope of the present disclosure. Therefore, the present disclosure is intended to include all known or earlier developed alternatives, modifications, variations, improvements and/or basic equivalents.

MAIN REFERENCE NUMERALS

First Aspect:
- Thermally responsive actuator 100
- Housing 110
- First axial end 112
- Second axial end 114
- Housing cavity 115
- Opening 119
- Expansion material 120
- Piston 130
- Piston head 132
- Piston rod 135
- Closure assembly 140
- Cover device 230
- Outer cover 231
- Outer cover connecting passage 233
- Inner cover 235
- Inner cover connecting passage 237
- Step portion 239 (of the inner cover)
- Sealing device 240
- First sealing member 241
- Second sealing member 242
- Connecting passage 243 (of the first sealing member)
- Head 244
- Shank 246
- Washer 250
- Body 331
- Bottom 332
- Open end 333
- Connecting portion 334
- Outer cover cavity 335
- Blocking portion 336
- Step portion 362 (of the housing)
- Flange 365
- Limiting structure 390
- First accommodating portion 371
- Second accommodating portion 372.

Second Aspect:
- Thermally responsive actuator 400
- Housing 410
- First axial end 412
- Second axial end 414
- Housing cavity 415
- Opening 419
- Expansion material 420
- Piston 430
- Piston head 432
- Piston rod 435
- Closure assembly 440
- Cover device 530
- Outer cover 531
- Outer cover connecting passage 533
- Inner cover 535
- Inner cover connecting passage 537
- Sealing device 540
- First sealing member 541
- Second sealing member 542
- Connecting passage 543 (of the first sealing member)
- Head 544
- Shank 546
- Washer 550
- Flange 635 (of the outer cover)
- First open end 633
- Connecting portion 634
- Second open end 636
- First outer cover cavity 637
- Separating portion 638
- Second outer cover cavity 639
- Flange 665 (of the housing)
- First accommodating portion 671
- Second accommodating portion 672
- Inner cover accommodating portion 675
- Step portion 678.

What is claimed is:

1. A thermally responsive actuator, comprising:
- a housing comprising a housing cavity and an opening in connection with the housing cavity;
- a thermal expansion material accommodated in the housing cavity;
- a piston extending at least partially through the opening into the housing cavity; and
- a closure assembly comprising a cover device and a sealing device, the closure assembly being attached to the housing at the opening, and the closure assembly covering the opening and surrounding the piston;
- wherein the cover device comprises a radially projecting portion at an open end thereof which contacts a flange of the housing;
- wherein the sealing device comprises a first sealing member and a second sealing member; and
- wherein one or both of the housing and the cover device define(s) a first accommodating portion and a second accommodating portion, wherein the first accommodating portion and the second accommodating portion are separated from each other in an axial direction of the thermally responsive actuator by the cover device, so as to independently accommodate at least a portion of the first sealing member and at least a portion of the second sealing member, respectively.

2. The thermally responsive actuator according to claim 1, wherein the first accommodating portion and the second accommodating portion respectively have a predetermined first axial distance and a predetermined second axial distance.

3. The thermally responsive actuator according to claim 1, wherein the second sealing member is further away from the expansion material than the first sealing member, wherein a minimum operating temperature of the second sealing member is less than a minimum operating temperature of the first sealing member, and an oil resistance of the first sealing member is superior to an oil resistance of the second sealing member.

4. The thermally responsive actuator according to claim 3, wherein the first sealing member is made of any one of the materials from the following group: hydrogenated nitrile rubber and nitrile rubber; and the second sealing member is made of any one of the materials from the following group: ethylene propylene diene monomer and silicone rubber.

5. The thermally responsive actuator according to claim 2, wherein the cover device comprises an outer cover comprising a separating portion, the first accommodating portion and the second accommodating portion being separated by the separating portion of the outer cover.

6. The thermally responsive actuator according to claim 5, wherein the cover device further comprises an inner cover disposed in the outer cover, the first axial distance of the first accommodating portion is defined by the inner cover and the separating portion of the outer cover, and the second axial distance of the second accommodating portion is defined by the housing and the separating portion of the outer cover.

7. The thermally responsive actuator according to claim 2, wherein the cover device comprises an outer cover and an inner cover, the inner cover being disposed in the outer cover, and the first accommodating portion and the second accommodating portion being separated by the inner cover.

8. The thermally responsive actuator according to claim 7, wherein the inner cover and the outer cover are provided with a limiting structure to limit movement of the inner cover relative to the outer cover in a direction away from the expansion material.

9. The thermally responsive actuator according to claim 8, wherein the outer cover comprises a bottom away from the housing, the first axial distance of the first accommodating portion is defined by the inner cover and the housing, and the second axial distance of the second accommodating portion is defined by the inner cover and the bottom of the outer cover.

10. A thermally responsive actuator, comprising:

a housing defining a housing cavity and an opening in connection with the housing cavity;

a thermal expansion material accommodated in the housing cavity;

an outer cover partially inserted into the housing at the opening, the outer cover having a separating portion defining an outer cover connecting passage;

a piston extending at least partially through the outer cover connecting passage into the housing cavity; and a first sealing member comprising a head, and a second sealing member sealingly connecting the piston with the outer cover;

wherein the first sealing member's head is inserted into the outer cover and the first sealing member is separated from the second sealing member by the separating portion of the outer cover.

11. The thermally responsive actuator according to claim 10, wherein the outer cover defines a first outer cover cavity and a second outer cover cavity on opposite sides of the separating portion, wherein the second outer cover cavity is further away from the expansion material than the first outer cover cavity;

the thermally responsive actuator further comprises an inner cover disposed in the second outer cover cavity;

wherein the first sealing member is at least partially accommodated in the first outer cover cavity, and the second sealing member is accommodated between the inner cover and the separating portion of the outer cover.

12. The thermally responsive actuator according to claim 10, wherein the second sealing member is further away from the expansion material than the first sealing member, wherein a minimum operating temperature of the second sealing member is less than a minimum operating temperature of the first sealing member.

13. A thermally responsive actuator, comprising:

a housing defining a housing cavity and an opening in connection with the housing cavity;

a thermal expansion material accommodated in the housing cavity;

an outer cover attached to the housing at the opening and having a bottom defining an outer cover connecting passage, wherein the outer cover comprises a flange or blocking portion;

an inner cover disposed in the outer cover abutting the flange or blocking portion and having an inner cover connecting passage;

a piston extending at least partially through the outer cover connecting passage and the inner cover connecting passage into the housing cavity; and a first sealing member and a second sealing member sealingly connecting the piston with the outer cover;

wherein the first sealing member and the second sealing member are separated by the inner or outer cover.

14. The thermally responsive actuator according to claim 13, wherein the outer cover defines an outer cover cavity located on a side of the bottom close to the expansion material, and the second sealing member, the inner cover, and at least part of the first sealing member are accommodated in the outer cover cavity.

15. The thermally responsive actuator according to claim 13, wherein the second sealing member is further away from the expansion material than the first sealing member, wherein a minimum operating temperature of the second sealing member is less than a minimum operating temperature of the first sealing member.

16. The thermally responsive actuator according to claim 13, wherein the first sealing member and the second sealing member are separated by the outer cover.

17. The thermally responsive actuator according to claim 1, wherein the first sealing member comprises a head inserted into the open end of the cover device.

18. The thermally responsive actuator according to claim 1, wherein the cover device extends outside the housing.

19. The thermally responsive actuator according to claim 10, wherein the housing comprises a flange which cooperates with the outer cover.

20. The thermally responsive actuator according to claim 10, wherein the outer cover comprises a flange or blocking portion which abuts the inner cover.

* * * * *